Sept. 22, 1959   B. I. SMITH ET AL   2,905,629
HIGH TEMPERATURE CONVERSION OF HEAVY OILS
Filed April 13, 1955   3 Sheets-Sheet 1

BROOK I. SMITH
HAROLD W. SCHEELINE   INVENTORS
EDWARD D. BOSTON

BY L. Chasan   ATTORNEY 2,905,629

HIGH TEMPERATURE CONVERSION OF HEAVY OILS

Brook I. Smith and Harold W. Scheeline, Elizabeth, and Edward D. Boston, Westfield, N.J., assignors to Esso Research and Engineering Company, a corporation of Delaware Application April 13, 1955, Serial No. 501,018

5 Claims. (Cl. 208—127)

The present invention relates to high temperature conversion of heavy oils, particularly of heavy residual oils such as reduced crude petroleum, coal tar bottoms and the like. The invention has particular utility in the coking of heavy hydrocarbon oils to produce a relatively wide range of unsaturated hydrocarbon products, especially those of moderately low molecular weight. The unsaturated hydrocarbons of low molecular weight are widely used as starting materials for production of various chemicals and polymers and the present invention is designed to facilitate the production of these starting materials. At the same time, the invention has as a major object the economical production of relatively large yields of the lower aromatic hydrocarbons, such as benzene, toluene, etc., within the gasoline boiling range, that is, below about 430° F., together with a group of $C_6$–$C_7$ unsaturated materials commonly known as resin-formers because of the ease with which they may be polymerized to form resinous products of commercial utility. These materials are useful not only as chemical raw materials and solvents but most of them are in demand in large quantities and at premium prices for motor fuel ingredients where high quality is needed.

Conversion processes of this general type have been suggested previously, e.g. in U.S. Patent No. 2,436,160 issued to Blanding. Reference may be had to this patent for general operating conditions. It will be understood, however, that the present invention involves some new concepts and techniques not disclosed by Blanding.

The economical conversion of heavy hydrocarbon oils to relatively low molecular weight products such as $C_{3-}$ gases, $C_4$–$C_7$ unsaturates, and lower aromatics depends upon several factors. Certain products of those just mentioned are produced in relatively large yields at particular operating conditions but at the expense of other valuable products in the same list which could be produced in larger or at least moderate quantities by varying the conditions slightly or to a reasonable degree. Factors such as conversion temperature, conversion severity (which is commonly a function of conversion time), total pressures or partial pressures and the like, are very important in controlling product distribution. The requisite control cannot ordinarily be obtained by merely adjusting temperatures or pressures.

According to the present invention, it has now been found that improved conversion and superior economic yields of the more valuable of the products listed above may be obtained by integrating control of certain additional factors into the coking process. Principal among these are (a) control of the extent of conversion to dry gases ($C_3$ and lighter) and (b) control of the hydrocarbon partial pressure at the outlet of the reaction zone.

The preferred coking process is one which utilizes fluidized or suspended heat carrying particles of a size range between about 5 and 1500 microns, preferably 20 to 400 microns average diameter, the particles being substantially inert catalytically. Other types of conversion processes such as steam cracking are affected to a considerable extent by the same control factors. To that extent, the invention is applicable also to other types of thermal processes carried out at very high temperatures. In general, the term "high temperature," as used herein, refers to reaction zone temperatures of around 1200° F. or higher.

High conversion of heavy oils, such as petroleum residua, to dry gas, i.e. $C_3$ and lighter, can be accomplished by high temperature thermal cracking as is well known. By conversion to dry gas, it is meant to define conversion to $C_3$ and lighter hydrocarbons plus hydrogen, the quantity of gas of the products being expressed either as standard cubic feet (s.c.f.) per pound of feed or as a percentage by weight of the original feed, on a coke-free basis. The latter expression will be more fully explained hereinafter but, in general, coke-free feed means the total feed minus the amount eventually converted to dry coke. High temperature conversions of this type commonly result in good yields of ethylene, if the temperature is above 1200° F. With increasing temperatures and conversion times production of ethylene goes up, along with other light gas products. It is not uncommon to secure dry gas yields of 40%, 50% or even more. Expressed another way, it is not unusual to produce 7, 8 or more s.c.f. of dry gases per pound of feed. However, one aspect of the present invention is the discovery that milder conversions than these are often more efficient and economical. High conversions result in substantial destruction of products having 4 or more carbon atoms and these are frequently the most valuable of all the materials produced. Moreover, the yields of low molecular weight materials such as hydrogen and methane and other products of low economic value are fairly high.

On the other hand, at very high conversion temperatures, for example 1300° or higher, and especially above 1500° F., the yields of aromatics such as benzene increase rapidly with increasing temperatures but so do yields of acetylenes. Where butadiene is a desirable product, as it usually is, the production of $C_4$ acetylenes in quantity is particularly undesirable because of the very considerable difficulty of separating the latter from butadiene.

Hence, when it is desired to produce butadiene, isoprene, resin-forming materials in the $C_6$ to $C_7$ range and also benzene in a single economical process, increased yields of any one of these are apt to be secured at the expense of considerable losses of some of the others. The matter of controlling conditions so as to get high yields, for example, of butadiene and $C_6$ to $C_7$ resin-formers while also obtaining reasonably good yields of benzene and related aromatics involves considerable difficulty. The present invention and the experimental work upon which it is based go a long way towards solving this difficulty.

Ordinarily, the most desirable products to be obtained by high temperature thermal cracking of heavy hydrocarbons are the $C_4$ and $C_5$ diolefins, such as butadiene, isoprene, piperylene and cyclopentadiene. These are used in large quantities in the production of synthetic rubber and related polymers and copolymers. The next most valuable products under present economic conditions are the unsaturated $C_6$ to $C_7$ resin-formers previously mentioned. Next in order, as a rule, are the lower aromatics such as benzene, toluene and unsaturated aromatic resin-formers such as styrene, indene, etc. Other unsaturated products such as ethylene and propylene have some value, the lower saturated hydrocarbons such as ethane and methane and hydrogen being of least value.

As noted above, highly aromatic naphthas, comprising the $C_6$ to 430° F. boiling range are always in demand in large quantity but at moderate prices. Some times the relative values of the products vary from the above but usually they are in the order listed. The diolefins are usually produced in relatively small quantities. Attempts to greatly increase their yields usually result in heavy sacrifices in yields of the other products. Hence one object of the present invention is to provide a balanced process wherein control is maintained simultaneously to a fair degree of accuracy to achieve good yields of the most valuable products consistent with over-all yields of all products that improve economy of operation.

A more specific object of the present invention is the production of near maximum yields of the $C_4$ and $C_5$ diolefins and $C_6$ to $C_7$ resin-formers, accompanied with good yields of the $C_6$ to 430° F. aromatics. The control of these yields is accomplished, as noted above, by an inter-control of conversion temperature and time to control total dry gas production plus further control by the use of low hydrocarbon partial pressure at the product outlet. Specifically, it is found that control of the over-all conversion to dry gas is highly important because the yields of the most desirable products, especially the diolefins and resin-formers vary considerably with this ratio. They also vary in a usually inverse relationship, and quite rapidly, with the hydrocarbon partial pressure maintained in the reaction zone.

The invention will be more clearly understood by reference to the accompanying drawings wherein Figure 1 is a graph showing the effect of dry gas conversion levels on total yields of $C_4$ to $C_5$ diolefins plus $C_6$–$C_7$ resin-formers;

Figure 1:
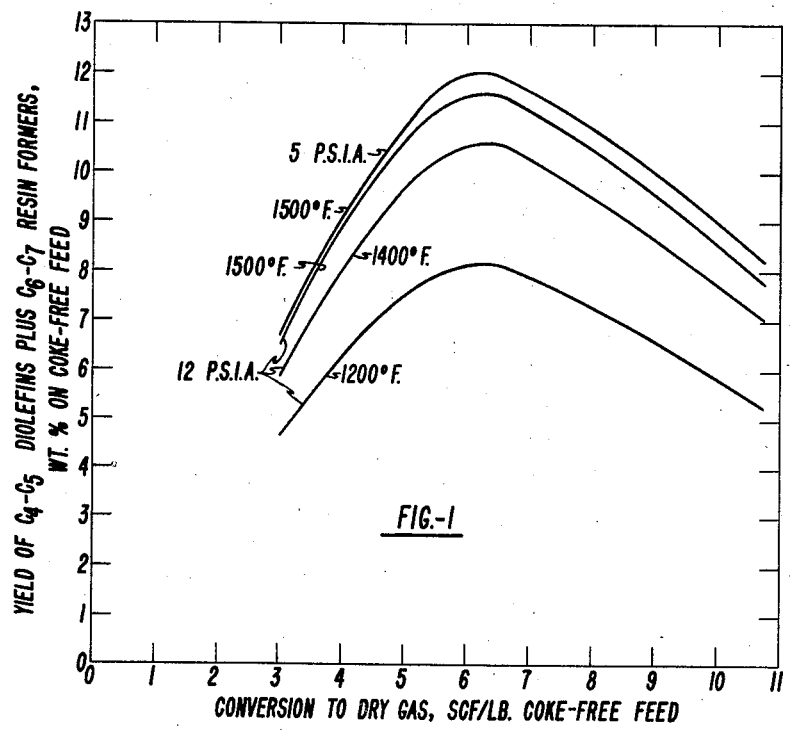

Referring now to Fig. 1, it will be noted that the graph shows a total yield of $C_4$–$C_5$ diolefins plus the $C_6$–$C_7$ unsaturated predominantly linear and polymerizable hydrocarbons which are useful for making light colored resins and are commonly called resin-formers. On the basis of coke-free feed, by weight, this yield increases with increasing temperatures. Aside from this, however, at each temperature the total yield passes through a maximum at about the point where the dry gas ($C_3$—) yield is between 6 and 7 standard cubic feet per pound of coke-free feed. The effect of dry gas conversion level is very striking, and is quite independent of conversion temperature. At a given temperature, the lower dry gas conversion level produces less $C_4$–$C_5$ diolefins and more $C_6$–$C_7$ resin-formers than higher conversion levels. The total of these, however, passes through a definite maximum. This is true although the total conversion of feed to coke and to other gas and liquid products, respectively, is substantially unchanged. These data are clearly indicated in Fig. 1 and are given in fuller detail in Table I. The feed employed for these data was a South Louisiana residuum.

TABLE I

*Effect of conversion level*

| Run No. | 1 | 2 | 3 | 4 |
|---|---|---|---|---|
| Temp., ° F. | 1,260 | 1,250 | 1,260 | 1,268 |
| HC part. press., p.s.i.a. | 8 | 8 | 5 | 5 |
| Conversion to $C_3$ and lighter gas: | | | | |
| S.c.f./lb. feed | 2.89 | 4.60 | 5.55 | 9.12 |
| S.c.f./lb. coke-free feed | 3.48 | 5.55 | 6.70 | 11.0 |
| Yields, weight percent on feed: | | | | |
| $C_4$–$C_5$ diolefins | 1.5 | 4.8 | 5.3 | 3.4 |
| $C_6$–$C_7$ resin-formers | 3.4 | 2.5 | 1.9 | 1.1 |
| Other gas and liquid products | 78.1 | 75.7 | 75.8 | 78.5 |
| Coke | 17 | 17 | 17 | 17 |
| Yields, weight percent on coke-free feed: | | | | |
| $C_4$–$C_5$ diolefins plus $C_6$–$C_7$ resin-formers | 5.9 | 8.8 | 8.7 | 5.4 |

It is clear from Fig. 1 and from Table I that the optimum level of total $C_4$–$C_5$ diolefins and $C_6$–$C_7$ resin-formers is obtained by keeping the dry gas conversion level between about 4 and 8 s.c.f. per pound of feed on a coke-free basis.

The coke-free basis mentioned is determined originally by actual measurement of the weight of dry coke produced, this quantity being deducted from the weight of the feed. However, from a large mass of data which have been obtained it is now quite possible to compute coke-free feed by knowing the carbon and hydrogen content of the feed stock and the Conradson carbon residue number of the feed in weight percent.

Thus, where D=the coke deposit in weight percent of feed, obtained on conversion to lighter products and coke, it is found by experiments that D also is equal numerically to the largest of the terms R, the Conradson carbon residue, or C—11H+5.8G where C and H, respectively, are weight percentages of carbon and hydrogen in the feed and G is s.c.f. of dry gas produced for each pound of feed on coke-free basis.

Now, for optimum production P of $C_4$–$C_5$ diolefins plus $C_6$–$C_7$ resin-formers, the formula becomes $$P=G(1-0.01R)$$

where G, the cubic feet of dry gas per pound of coke-free feed, is not less than 4 nor more than 8 or $$P=G\frac{(1-0.01C+0.11H)}{1+0.058G}$$

whichever is the smaller.

Figure 2:
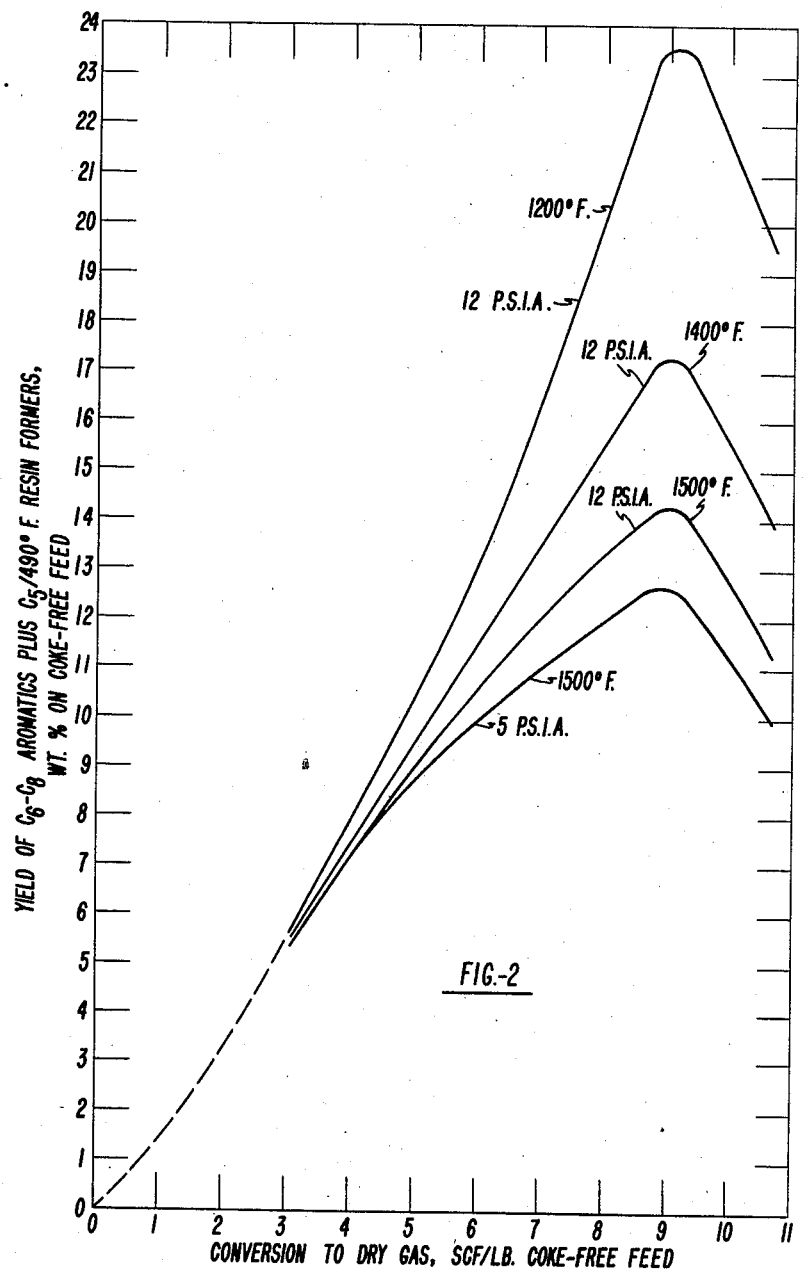
Figure 2 is a graph showing the effect of dry gas conversion levels on total yields of $C_6$–$C_8$ aromatics plus $C_5$–490° F. resin-formers.

The optimum range shifts only moderately when the most valuable products are the $C_6$ to $C_8$ aromatics plus the broader and largely aromatic series of unsaturated hydrocarbons ranging from $C_5$ (isoprene, piperylene) to the 490° F. boiling range, known generally as resin-formers, because they polymerize readily. These hydrocarbons usually produce hard and dark colored polymers. Yields are indicated graphically in Fig. 2 where the maxima are quite sharply defined. The total yields are higher at lower temperature—just the reverse of the results in Fig. 1. However, the maxima (total) are still within the range of about 5 to 10 s.c.f. dry gas per pound of coke-free feed.

The same general phenomena are observed on switching to other feed stocks. So long as the operating conditions are regulated to obtain dry gas conversion within the preferred limits, the yields of the most valuable products remain high.

Thus, as shown in Table II, when the conversion conditions were regulated (by control of contact time) to keep the dry gas yield constant (on a coke-free feed basis) the yields of butadiene, $C_5$ diolefins, and $C_6$–$C_7$ resin-formers remained quite constant.

TABLE II

*Effect of feedstock*

| Example | A | B |
|---|---|---|
| Feedstock | Virgin gas oil | So. La. resid. |
| Temperature, ° F. | 1,260 | 1,260. |
| Hydrocarbon part. press., p.s.i.a. | 5 | 5. |
| Conversion to $C_3$ and lighter gas: | | |
| S.c.f./lb. feed | 6.67 | 5.54. |
| S.c.f./lb. coke-free feed | 6.67 | 6.67. |
| Yields, weight percent on coke-free feed: | | |
| Total dry gas containing substantial portions of ethylene, propylene, methane, etc. | 43.3 | 39.3. |
| Butadiene | 3.2 | 3.1. |
| $C_5$ diolefins | 3.1 | 2.9. |
| $C_6$–$C_7$ resin-formers | 2.7 | 2.5. |
| Other $C_4$/430° F. | 24.8 | 20.8. |

The two feeds shown in Table II are quite different. The virgin gas oil has substantially no Conradson carbon residue whereas the heavy south Louisiana residuum has substantial residue, 17%. On a total feed basis, dry gas conversion was 39.3% by weight for the residuum and 43.3% for the virgin gas oil. Still the total yields of butadiene, $C_5$ diolefins and $C_6$–$C_7$ resin-formers are nearly identical.

The formula for optimum production of $C_6$–$C_8$ aromatics plus the largely aromatic $C_5$–490° F. resin-formers is the same as that given above, i.e. the smaller of the expressions $$G(1-0.01R)$$

or $$G\left(\frac{1-0.01C+0.11H}{1+0.058G}\right)$$

but here G is preferably within the range of 6 to 10 rather than 4 to 8. The over-all range for all the products then lies between about 4 and 10 s.c.f. of dry gas per pound of feed on coke-free basis. The latter basis is important.

Turning now to consideration of the effect of hydrocarbon partial pressure, it will be noted in Table I that this amounted to 8 p.s.i.a. in the first two runs and 5 p.s.i.a. in the last two. In Table II, Examples A and B were both run at 5 p.s.i.a. (using steam to reduce the partial pressure). For optimum production of $C_4$–$C_5$ diolefins the lower partial pressures are preferred whereas higher pressures are suitable for production of aromatics. The preferred operating conditions for the two general classes of products are compiled in Table III.

TABLE III

Preferred operating conditions

| Primary product | $C_4$–$C_5$ diolefins plus $C_6$–$C_7$ resin-formers | $C_6$–$C_8$ aromatics plus $C_5$–490° F. resin-formers |
| --- | --- | --- |
| Conversion to $C_3$ and lighter gas, s.c.f./lb. coke-free feed | 4–8 | 8–11 |
| Temperature, °F | 1,200–1,500 | 1,350–1,700 |
| HC partial pressure, p.s.i.a | <20 | >20 |

From the foregoing, it is clear that control of the severity of conversion, as measured by production of dry gas, is a major factor in control of the product distribution. In general, at higher severity the production of butadiene, $C_5$ diolefins, and $C_6$ to $C_7$ resin-formers drops off markedly. The production of aromatics, including the broad $C_5$ to 490° F. class of resin-formers which are largely aromatic, goes up rapidly as does the concentration of such aromatics in the gasoline fraction. Ethylene production, while higher in absolute value, drops off in its ratio to total dry gas. These data are compiled in Table IV.

TABLE IV

|  | High severity | Normal severity |
| --- | --- | --- |
| Example | C | D |
| Temperature, °F | 1,360 | 1,250 |
| Hydrocarbon partial pressure, p.s.i.a | 10 | 8 |
| Conversion to dry gas, s.c.f./lb. of coke-free residuum feed | 13.7 | 5.1 |
| Yields, weight percent on total residuum feed: |  |  |
| Butadiene | 1.6 | 2.3 |
| $C_5$ diolefins | 1.8 | 2.9 |
| $C_6$–$C_7$ resin-formers | 0.5 | 2.8 |
| $C_6$–$C_8$ aromatics | 9.5 | 3.7 |
| $C_5$–490° F. resin-formers | 5.6 | 4.7 |
| Coke | 24 | 17 |
| Concentration of aromatics in $C_5$–430° F. after removal of resin, weight percent | 95 | 28 |
| Concentration of ethylene in $C_2$ and lighter, mol. percent | 26 | 36 |

While the foregoing discussion has not been directed to any specific conversion process, the presently preferred process for application of the principles of the invention will next be described in some detail.

Figure 3:
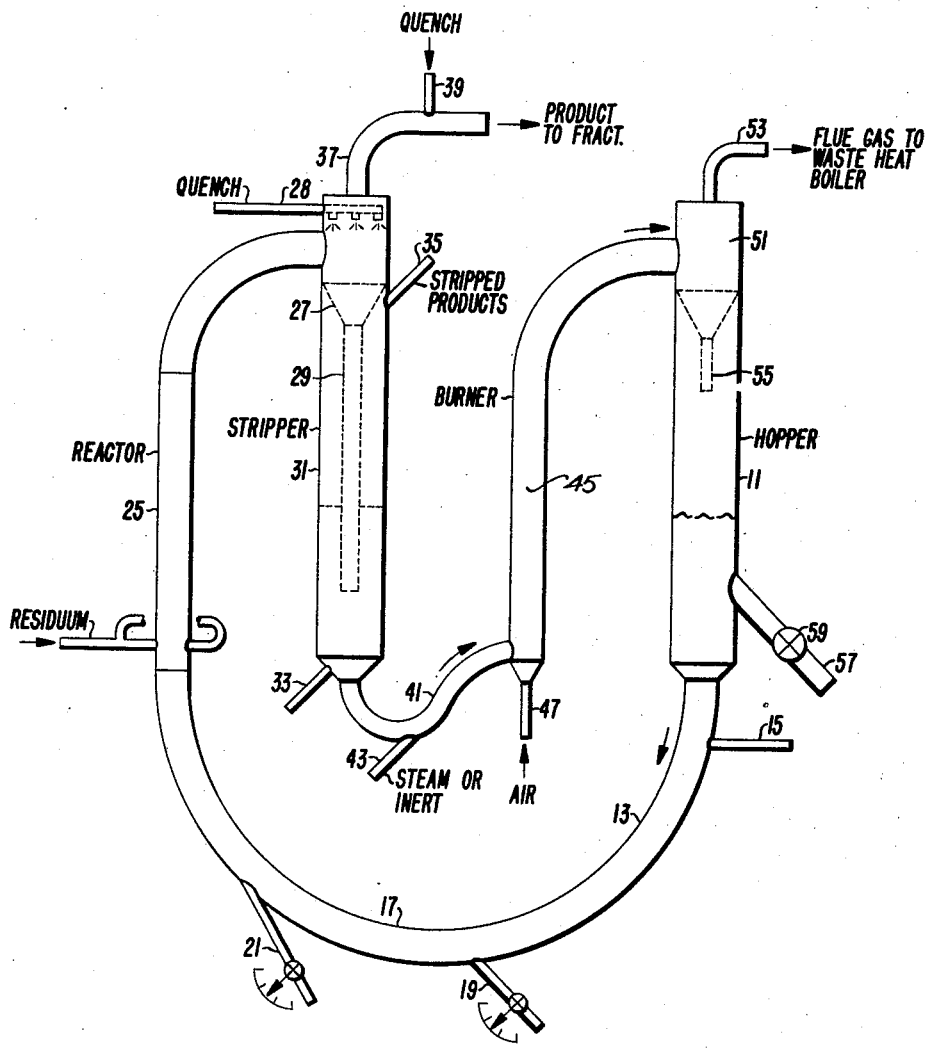
Figure 3 shows diagrammatically a typical high temperature conversion system suitable for carrying out the process.

Referring to Fig. 3, there is shown a hopper or accumulator 11 for fluidized and preheated solid particles of heat carrying material. These particles are relatively and preferably substantially completely non-catalytic. Hopper 11 is connected at the bottom to a transfer line 13 into which a fluidizing and/or stripping gas may be introduced through inlet 15. The hot fluidized solids flow downward by gravity into the transfer line. A suitable valve, not shown, may be provided to control and/or shut off the flow when desired.

Transfer line 13 includes a reverse bend 17 and additional fluidizing and/or lifting gas may be introduced at inlets 19 and 21. As many inlets as are needed will be used, as is well understood in the art. Variable controls are desirable here, as indicated, to control steam supply and thereby control hydrocarbon partial pressure in the reactor.

The ascending leg of the transfer line, particularly the upper portion thereof, serves as the reactor vessel for the system as indicated at 25. The feed to be converted, typically a heavy petroleum residuum, is sprayed, through a suitable nozzle system 27 into the ascending stream of hot solid particles. The feed is preferably preheated and is usually and preferably substantially in liquid form, but it may comprise solid particles of pitch, bitumen, bituminous coal, etc. The fluidized or suspended heat carrying particles contact the feed, which is in finely divided form, and cause thermal conversion thereof. The temperature of these particles is sufficiently high to maintain the desired reaction temperature.

This temperature may be from as low as 1150° F. to as high as 1600° F. or even higher. For optimum production of butadiene, $C_5$ diolefins and the $C_6$–$C_7$ resin-formers a temperature below about 1350° F. is desirable, preferably between 1200 and 1300° F. Where the $C_6$–$C_8$ aromatics and related products are more in demand, higher temperatures, desirably above 1300° F. and preferably above 1350° F. are needed.

In any case, the fluidizing gas may be steam or light hydrocarbon gases. Where it is desirable to keep hydrocarbon partial pressure low, as it is particularly for production of butadiene and related materials, steam or other non-hydrocarbon gas must be used in suitable proportions. The system of Fig. 3 is quite operable at or near atmospheric pressures. However, it may be operated at elevated pressures, up to 50 p.s.i.g., 100 p.s.i.g. or even higher if desired. Pressure operation, of course, requires pressure control valves, etc., not shown.

The time of reaction between the feed and the hot solid particles in reactor 25 is quite short, preferably 0.05 to 1 second or so. This time depends, of course, on the dimensions of the reactor and the velocity and dispersity of the solids passing through it. The severity of conversion, e.g. to dry gas, depends on both the temperature and the contact time. The severity should be sufficient to convert the feed substantially entirely to vapors and carbonaceous residue or coke. The latter is deposited upon the heat-carrying solids which are cooled somewhat.

The stream of solids, vapors, etc., emerging from the transfer line reactor 25 passes into a cyclone type separator 27 where a quenching spray 28, e.g. of hydrocarbon oil such as the feed, is injected to cool the vapors so as to partially quench further reaction. Here cooling should be at least 50° F. to substantially inhibit further reaction. The solids are separated and passed downwardly through the cyclone solids outlet line 29 into a stripper 31. Steam or other inert fluid is introduced into the bottom of stripper 31 through line 33 and the stripped gas or vapor products are removed through line 35 and taken to a suitable recovery system, not shown.

The partially quenched vapor products pass overhead from separator 27 through outlet line 37 where they may be further quenched by a suitable coolant. The latter, introduced as a spray from line 39, quickly reduces the product temperature sufficiently to completely prevent further autodegradation of the products. Cooling here should be at least 100° F. The coolant may be water, inert hydrocarbons, or even a stream of relatively cool solid particles, as is known in the art. Quenching at 28 may sometimes be sufficient but since it involves cooling the solids (which must thereafter be reheated as will be explained) it is usually preferred to quench only moderately, e.g. by cooling 50° to 100° F. at 28 and cool further, preferably at least 100° F. and usually further at 39. The quenched products are then taken to a suitable fractionator or other recovery apparatus, not shown.

After stripping, the spent solids in stripper 31 are taken through line 41 through a reverse bend into a reheating or burning zone. Steam or other lifting or aerating gas is introduced by means of line 43. The heating or burning zone is in a transfer line burner 45 having an air inlet 47 at the bottom thereof. Additional air inlets, not shown, may be provided if desired.

Within the heater or burner 45, the solids are usually reheated to the desired temperature by combustion of part or all of the carbonaceous solids deposited thereon in the reactor. If desired, however, a combustible fuel, such as gas or torch oil, may be introduced with the air to supply part or all of the heat required.

The hot solids, with the gases of combustion pass upwardly into a separator or cyclone 51 from which the flue gases pass overhead. The separated solids pass downwardly into hopper 11 from whence the cycle is repeated continuously.

While various solids, such as sand, mullite, corborundum, metallic particles and the like may be used, petroleum coke itself, as produced in the process is commonly preferred because of its ready availability. Commonly, more coke is produced than is needed for combustion to supply the heat requirements. Hence the surplus may be withdrawn, e.g. through line 57 under control of valve 59 for other uses.

The hydrocarbon partial pressure in the reaction zone may be reduced by increasing the steam feed through lines 19, 21. As previously indicated, for $C_4$–$C_5$ diolefins, the partial pressure should be below 12 p.s.i.a. and preferably below 10, 5 to 8 p.s.i.a. being a preferred range. For other products it may be higher, e.g. up to 20 p.s.i.a or more. Likewise, the velocity of the solids, the degree of their dispersion, and the contact time before quenching may be controlled by the steam feed rate. The temperature of the solid particles and their circulation rate may be controlled by the amount of air admitted at 47. Various other controls will suggest themselves and both the apparatus and the process may be modified and varied as will be obvious to those skilled in the art.

The solid particles employed, preferably coke, should be of fluidizable size, but may vary from very fine, e.g. 10 microns to rather coarse, e.g. up to 800 microns or more average diameter, the preferred range being 20 to 400.

In summary, the process of this invention involves the conversion of heavy hydrocarbon or hydrocarbonaceous materials to low boiling materials, with selective control over the products, achieved by (a) controlling the severity of conversion by surveillance of dry gas production to hold it between about 4 and 10 s.c.f. per pound of feed while (b) controlling the hydrocarbon partial pressure within the reaction zone. The controls needed are further determined by ascertaining the Conradson carbon number of the feed and the percentage of carbon and hydrogen therein, then applying the formulas enumerated above. A shift from optimum production of $C_4$–$C_5$ diolefins plus $C_6$–$C_7$ resin-formers (for light colored resins) to primarily aromatic materials (plus ethylene and some acetylenes and including resin-formers for dark colored resins) involves merely a shift of conditions to raise the dry gas production to the alternative optimum range. By controlling hydrocarbon partial pressure, further control over the process is obtained.

Obvious variations may be practiced, within the scope of the invention, and it is intended to cover such so far as the prior art will permit. The preliminary quenching, by 50° F. or more, may be made more complete if desired to eliminate the second quenching in same cases, but both steps are usually desirable. The size as well as the character of the solids and also the feed may be varied considerably.

What is claimed is:

1. The process of converting heavy hydrocarbonaceous materials to low boiling normally vaporous or liquid hydrocarbons and solid carbonaceous residue which comprises feeding a stream of said materials in finely divided form into contact with a fluidized mass of substantially non-catalytic heat carrying solid particles of carbonaceous residue produced in the process at a reaction temperature of at least 1150° F. for a time sufficient to cause conversion of the feed to at least 4 and not more than about 10 s.c.f. of dry gas ($C_3$—) per pound of cake-free feed, while supplying enough non-hydrocarbon gas to the reaction zone to keep hydrocarbon partial pressure below about 20 p.s.i.a. to thereby obtain substantially optimum economic yields of $C_4$–$C_5$ diolefins, $C_6$–$C_7$ resin-formers and lower aromatics, substantially irrespective of the quality of the feed.

2. The process of obtaining high yields of diolefins and other unsaturates from heavy hydrocarbon oil, which comprises feeding said oil in finely subdivided particles into contact with a mobile mass of finely divided heat carrying solid particles capable of being suspended in a gasiform stream, said particles being preheated sufficiently to keep the reaction temperature above 1150° F., maintaining said contact for a sufficient length of time to convert substantially all said feed to vapors and carbonaceous residue while controlling the severity of conversion so as to keep dry gas production at a level between 4 and 8 s.c.f. per pound of coke-free feed mantaining hydrocarbon partial pressure below about 12 p.s.i.a., passing a stream of the vapor and gas products including entrained solids out of the reaction zone, quenching the stream by injecting sufficient coolant to lower its temperature by at least 50° F., and separating the solids from the vapor and gas products.

3. The process of converting heavy petroleum residua to coke and vapors of high economic value, which comprises preheating a supply of finely divided solid particles of average diameter within the approximate range of 20 to 400 microns to a temperature above 1150° F., passing a stream of said particles by means of a suspending gas through an extended reaction zone, feeding finely divided petroleum residue, substantially in liquid phase, into said zone to contact said particles, maintaining a contact time from about 0.05 to about 1 second at a temperature above 1150° F., so controlled as to cause production of about 6 to 8 s.c.f. of dry gas ($C_3$—) per pound of coke-free feed, thereby also producing other vapors and carbonaceous residue, passing the gases, vapors and suspended particles out of said reaction zone, separating the solids, quenching the gas and vapor products, burning part of the carbonaceous residue to reheat part of the solids and recycling the reheated solids to the reaction zone in a continuous process.

4. Process according to claim 3 wherein hydrocarbon partial pressure in the reactor is kept below 12 p.s.i.a. by using steam as a diluent and carrying gas for the particles.

5. A process for producing high yields of desired hydrocarbon chemicals, which comprises feeding a heavy hydrocarbon oil into a mass of hot inert solids maintained in a reaction zone at a temperature above 1150° F., converting said hydrocarbon oil by controlling the level of conversion at a conversion level of between 4 and 10 s.c.f. of dry gas ($C_3$—) per pound of coke-free feed, a reaction time in the range of 0.05 to 1.0 second being employed and non-hydrocarbon gas being supplied to said reaction zone to maintain a hydrocarbon partial pressure of less than 20 p.s.i.a. within said reaction zone, thereby producing optimum economic yields of $C_4$–$C_5$ diolefins, $C_6$–$C_7$ resin-formers and lower aromatics.

References Cited in the file of this patent

UNITED STATES PATENTS

| | | |
|---|---|---|
| 2,426,160 | Blanding | Feb. 17, 1948 |
| 2,698,672 | Burnside et al. | Jan. 4, 1955 |
| 2,731,508 | Jahnig et al. | Jan. 17, 1956 |